Jan. 20, 1925.

A. B. CLARK 1,523,473

REPEATER CIRCUITS

Filed Sept. 28, 1922

INVENTOR.
A. B. Clark
BY
ATTORNEY

Patented Jan. 20, 1925.

1,523,473

UNITED STATES PATENT OFFICE.

ALVA B. CLARK, OF BROOKLYN, NEW YORK, ASSIGNOR TO AMERICAN TELEPHONE AND TELEGRAPH COMPANY, A CORPORATION OF NEW YORK.

REPEATER CIRCUITS.

Application filed September 28, 1922. Serial No. 591,152.

*To all whom it may concern:*

Be it known that I, ALVA B. CLARK, residing at Brooklyn, in the county of Kings and State of New York, have invented certain Improvements in Repeater Circuits, of which the following is a specification.

This invention relates to improvements in repeater circuits.

In former repeater circuit arrangements, in which the repeater elements comprise the well known vacuum tube, it has been the practice to supply the space current for the output circuit of the tube either by bridging a battery having a retardation coil in series therewith from one side of the output circuit to ground or by connecting a battery in series with the output transformer to the plate. With the space battery and retardation coil bridged across the output circuit to ground, it was necessary to make the impedance of the retardation coil relatively high so that it would not shunt out the lower frequencies. With the space battery in series with the output transformer there would be a tendency for cross-talk to occur when several output circuits were supplied with current from the same battery. In the arrangements of this invention the space current for the output circuit is supplied from a battery and a relay winding in series with the output transformer and with a condenser in bridge from a point between the relay and output transformer to the filament or ground. Such an arrangement presents several distinct advantages over prior arrangements. As the space battery is in series in the output circuit rather than in shunt across said circuit a retardation coil of relatively high impedance is not necessary and the winding of a relatively cheap relay or retardation coil may be substituted therefore and result in a considerable reduction in expenditure. With a condenser shunt around the space battery and relay the alternating current path of the output circuit does not include the battery and relay winding. This obviates cross-talk and also introduces less transmission loss particularly at low frequencies. The contacts of the relay substituted for the retardation coil in accordance with the invention are utilized to control an alarm circuit whereby an indication may be given should the space current of a tube fail. As the space current is dependent upon the filament current this same alarm circuit will give an indication of a failure of the filament current and special apparatus for this purpose may be done away with. Other features of the invention will appear more fully from the detailed description hereinafter given.

Figure 2:
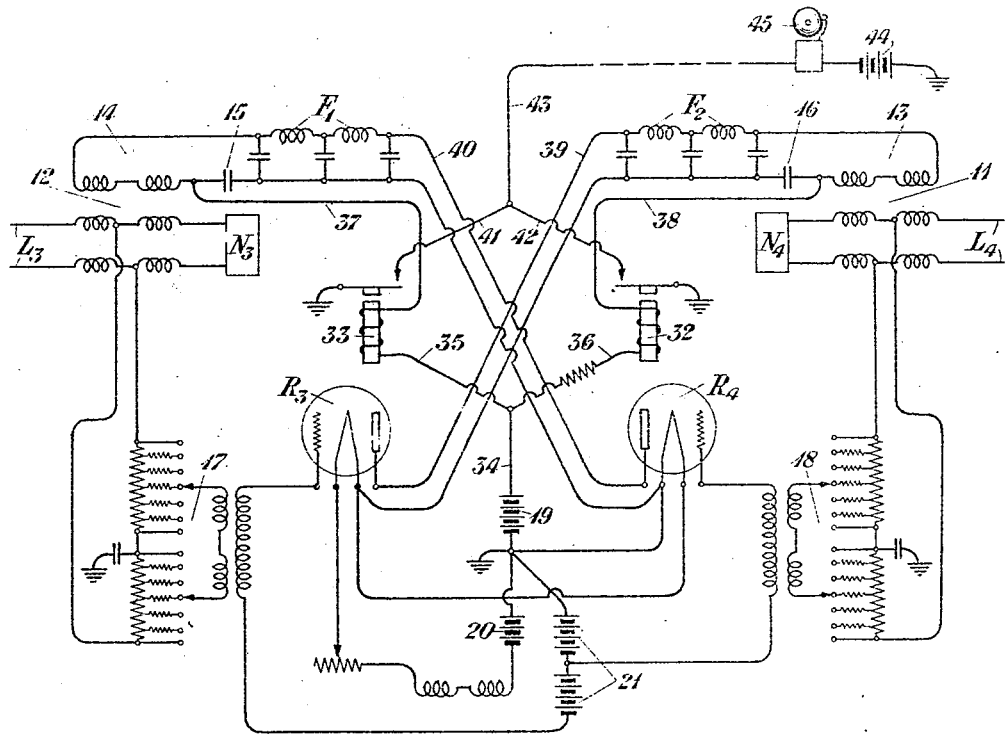
Figure 4:
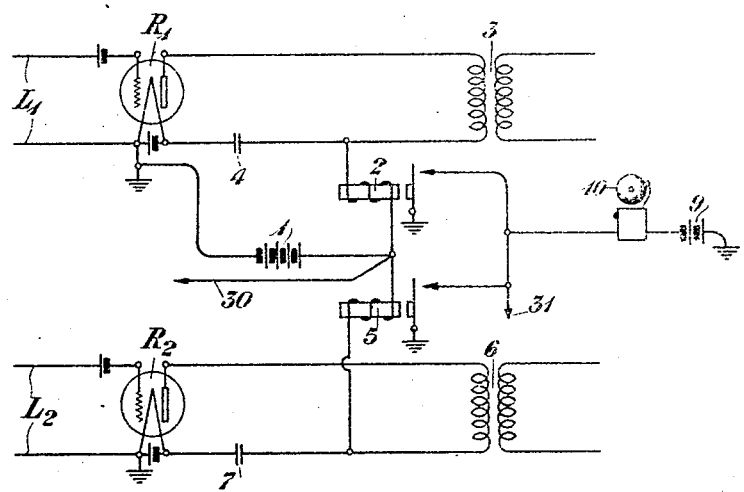

The invention may be more fully understood from the following description together with the accompanying drawing in the Figures 1 and 2 of which the invention is illustrated. Fig. 1 shows a plurality of one way repeater circuits embodying the invention, while in Fig. 2 the invention is shown in a two way two element repeater circuit.

In Fig. 1 are shown two one way repeater circuits $L_1$ and $L_2$, which include as the repeater elements the vacuum tubes $R_1$ and $R_2$, which are of a type well known in the art and include a grid, a filament, and a plate electrode. Potential is applied to the plate of tube $R_1$ from the battery 1 in the following manner: from ground, battery 1, winding of relay 2, winding of transformer 3, to the plate. Between the winding of relay 2 and winding of transformer 3 is a condenser 4 bridged either to ground or to the filament as shown. With this arrangement the alternating current path in the output of the tube will be as follows: from the filament, through condenser 4, winding of transformer 3, to the plate and filament. It is pointed out that this alternating current path does not include the plate battery 1 nor the winding of relay 2 and hence less transmission loss will be introduced than in former arrangements. Furthermore as the alternating current does not pass through battery 1 there will be less tendency for cross-talk to exist when other repeaters, such as $R_2$, are supplied with plate potential from battery 1. The plate potential for tube $R_2$ is supplied as follows: from ground, battery 1, winding of relay 5, winding of transformer 6, to the plate of tube $R_2$. Between the winding of relay 5 and the winding of transformer 6 is a condenser 7 bridged to ground or to the filament as shown. The alternating current path in the output of tube $R_2$ is then as follows: from the filament of tube $R_2$, condenser 7, winding of transformer 6, to the plate of $R_2$ and hence does not traverse the battery 1 or winding of relay 5. The windings of relays 2 and 5 should be of high enough impedance to prevent cross-talk between the circuits.

However, this impedance is not as high as is needed in the retardation coils utilized in former arrangements and hence a relatively inexpensive relay may be utilized in this connection and the expense of the retardation coils done away with. The relays 2 and 5 may be utilized to control an alarm circuit. Whenever the space current of either tube fails the corresponding relay becomes deenergized and closes a circuit from ground and its contacts through alarm 10 and the battery 9 to ground, thereby operating the alarm to give an indication of the failure of the current. Failure of the filament current interrupts the space current and thus also gives an alarm.

In Fig. 2 the arrangements of the invention are shown embodied in a two-way two-element repeater circuit. In this arrangement a common battery supply is provided for the filaments, grids, and plates and a detailed description thereof is given in a Patent No. 1,436,683, issued November 28, 1922, in the name of A. F. Rose. The arrangements comprise the vacuum tubes $R_3$ and $R_4$ which are of a type well known in the art. These tubes interconnect the line sections $L_3$ and $L_4$ with which are associated the balancing network $N_3$ and $N_4$. Associated with lines $L_3$ and $L_4$ are the usual three winding transformers 12 and 11. The output circuit 14 of tube $R_4$ is associated with a winding of transformer 12 and the output circuit 13 of tube $R_3$ is associated with a winding of transformer 11. The output circuits of the tubes may include the filters $F_1$ and $F_2$. The input circuits of the tubes may include the potentiometers 17 and 18. A common battery source 20 is provided for heating the filaments. Potential is applied to the grids from the common battery source 21. Potential is applied to the plate of tube $R_4$ over the following circuit: from ground and battery 19, conductors 34 and 35, winding of relay 33, conductor 37, winding of transformer 12, filter $F_1$, conductor 40, to the plate of tube $R_4$. At a point between winding of relay 33 and the winding of transformer 12 is a circuit bridged to the filament of tube $R_4$. This bridged circuit includes the condenser 15. Accordingly the alternating current path in the output of the tube $R_4$ will be as follows: from the plate, conductor 40, filter $F_1$, winding of transformer 12, condenser 15, to the filament of the tube $R_4$. The alternating current accordingly will not traverse the plate battery nor the winding of relay 33. Potential is applied to the plate of tube $R_3$ over the following circuit: from ground and battery 19, conductors 34 and 36, winding of relay 32, conductor 38, winding of transformer 11, filter $F_2$, conductor 39, to plate of $R_3$. At a point between winding of relay 32 and winding of transformer 11 is a circuit bridged to the filament of tube $R_3$. This bridged circuit includes the condenser 16. Accordingly the alternating current path in the output of tube $R_3$ will be as follows: from the plate, conductor 39, filter $F_2$, winding of transformer 11, condenser 16, to the filament. The alternating current accordingly will not traverse the plate battery nor the winding of relay 32. Relays 32 and 33 serve to control an alarm circuit comprising their armatures and contacts, conductors 41 and 42, conductor 43, alarm device 45 and battery 44. Whenever the plate or filament current fails these relays will be deenergized and close the alarm circuit to give an indication of the current failure.

While the invention has been disclosed in certain specific arrangements which are deemed desirable, it is understood that it is capable of embodiment in many and widely varied forms without departing from the spirit of the invention as defined by the appended claims.

What is claimed is:

1. A plurality of repeater circuits, each circuit including a vacuum tube having filament and plate electrodes, the output circuit of each tube comprising a condenser and a transformer winding serially connected between filament and plate, circuits connected to said output circuits at points between said condensers and transformers and terminating in a common battery, and relay windings in said circuits.

2. A plurality of repeater circuits, each circuit including a vacuum tube having filament and plate electrodes, the output circuit of each tube comprising a condenser and a transformer winding serially connected between filament and plate, circuits connected to said output circuits at points between said condensers and transformers and terminating in a common battery, relay windings in said circuits, and alarm circuits controlled by the contacts of said relays.

In testimony whereof, I have signed my name to this specification this 27th day of September, 1922.

ALVA B. CLARK.